United States Patent [19]

Houston

[11] 4,303,430

[45] Dec. 1, 1981

[54] METHOD AND APPARATUS FOR FORMING MINERAL FIBERS

[75] Inventor: Robert L. Houston, Newark, Ohio

[73] Assignee: Owens-Corning Fiberglas Corporation, Toledo, Ohio

[21] Appl. No.: 127,706

[22] Filed: Mar. 6, 1980

[51] Int. Cl.³ .............................................. C03B 37/04
[52] U.S. Cl. .............................................. 65/6; 65/14
[58] Field of Search ........................................ 65/5-7, 65/14-16

[56] References Cited

U.S. PATENT DOCUMENTS

| 328,226 | 10/1885 | Kennedy | 65/16 |
|---|---|---|---|
| 2,189,822 | 2/1940 | Thomas et al. | |
| 3,152,200 | 10/1964 | Kleist | 264/115 |
| 3,215,514 | 11/1965 | Levecque et al. | 65/6 |
| 3,785,791 | 1/1974 | Perry | 65/14 |
| 3,874,886 | 4/1975 | Levecque et al. | 65/16 X |
| 4,159,199 | 6/1979 | Levecque et al. | 65/16 X |

FOREIGN PATENT DOCUMENTS

| 219755 | 1/1958 | Australia | 65/14 |
|---|---|---|---|
| 70097 | 12/1940 | Czechoslovakia | 65/16 |

Primary Examiner—Robert L. Lindsay, Jr.
Attorney, Agent, or Firm—Ronald C. Hudgens; Philip R. Cloutier; Ted C. Gillespie

[57] ABSTRACT

A method and apparatus for forming fibers from molten mineral material comprising a rotatably mounted spinner (10) having an orificed peripheral wall (16) through which the material flows to form primary fibers (20), and a turbulent flow generator (26) adapted to discharge a flow of gases to further attenuate the primary fibers (20) into a veil of secondary fibers (24). The turbulent flow generator (26) generates gaseous flows exerting attenuation forces in different directions at different loci (38, 40, 42, 44) along the path of the fiber being further attenuated.

15 Claims, 4 Drawing Figures

METHOD AND APPARATUS FOR FORMING MINERAL FIBERS

TECHNICAL FIELD

This invention pertains to forming fibers from molten mineral material, such as forming glass fibers from molten glass. In one of its more specific aspects, this invention relates to centrifuging molten mineral material to form primary fibers, and further attenuating the primary fibers into secondary fibers by the action of a flow of gases.

BACKGROUND OF THE INVENTION

A common practice in forming fibers of mineral material is to pass the material in a molten state through the orifices of the peripheral wall of a centrifuge or spinner to create primary fibers. Thereafter, the primary fibers are further attenuated into a veil of secondary fibers of smaller diameter by the action of a flow of gases discharged downwardly. It is known in the prior art that the flow of gases can have high velocity in order to increase the air drag attenuation of the primary fibers into the secondary fibers. It is also known that the air drag attenuation provided to the primary fibers by the flow of gases can be greatly increased by creating some turbulence in the flow of gases.

One of the problems associated with fiber-forming apparatus of the prior art is that the blowers for secondary attenuation of the primary fibers into secondary fibers consume large amounts of energy. Another problem with the fiber-forming apparatus of the prior art is that limitations on the ability of the secondary attenuation function require that the primary fiber be sufficiently fine in diameter in order to result in an acceptably fine secondary fiber. For example, in order to form a secondary fiber within the range from about 4 to about 12 microns in diameter, it is necessary to produce a primary fiber having a diameter within the range of from about 15 to about 25 microns. The apparatus and method of this invention are directed towards the solution of the above problems.

According to this invention, there is provided apparatus for forming fibers comprising a spinner for centrifuging molten mineral material into primary fibers and a plurality of turbulent flow generators positioned circumferentially of the spinner to further attenuate the primary fibers into secondary fibers. The turbulent flow generators create turbulence sufficient to effect further attenuation of the fiber.

In one of its embodiments, the turbulent flow generators are vortex generators.

In another embodiment, the turbulent flow generators comprise two or more gas discharge conduits adapted to discharge gaseous flows which interact to form a vortex.

In another embodiment, adjacent vortices are counter-rotating.

In another embodiment, each of the turbulent flow generators comprises a gas discharge conduit adapted to discharge a gaseous flow, and a baffle positioned in the path of the gaseous flow, the baffle being adapted to increase the turbulence of the gaseous flow.

In another embodiment, the baffle is adapted to deflect the gaseous flow.

According to this invention, there is also provided apparatus for forming fibers comprising a spinner for centrifuging molten mineral material into primary fibers and a plurality of turbulent flow generators positioned circumferentially of the spinner to further attenuate the primary fibers into secondary fibers, each of the turbulent flow generators being adapted to generate gaseous flows exerting attenuating forces in different directions along the path of the fiber being further attenuated.

In one of its embodiments, the attenuation forces occur at spaced-apart loci within the turbulent flow.

According to this invention, there is also provided a method of forming fibers comprising centrifuging molten mineral material into primary fibers with a rotating spinner and further attenuating the primary fibers into secondary fibers by introducing the primary fibers into zones of turbulent gaseous flow, the zones being positioned circumferentially of the spinner. The zones have sufficient turbulence to effect further attenuation of the fiber.

According to this invention, there is also provided a method of forming fibers comprising centrifuging molten mineral material into primary fibers with a rotating spinner and further attenuating the primary fibers into secondary fibers by exerting attenuation forces in different directions at different loci within each of a plurality of zones of turbulent gaseous flow, the zones being positioned circumferentially of the spinner.

In one of its embodiments, vortices are generated to produce the attenuation forces.

In another of its embodiments, gas is discharged from two or more discharge conduits to generate each of the vortices.

In another of its embodiments, adjacent vortices are counter-rotating.

In yet another of its embodiments, gas is discharged from a gas discharge conduit and deflected with a baffle to generate the turbulent gaseous flow.

According to this invention, there is also provided the method of forming fibers comprising centrifuging molten mineral material into primary fibers with a spinner, generating a plurality of zones of turbulent gaseous flows positioned circumferentially of the spinner, each of the zones having gas flow in different directions at different loci within the zone, and further attenuating the primary fibers into secondary fibers by introducing the primary fibers into the zones.

DESCRIPTION OF THE INVENTION

Figure 1:
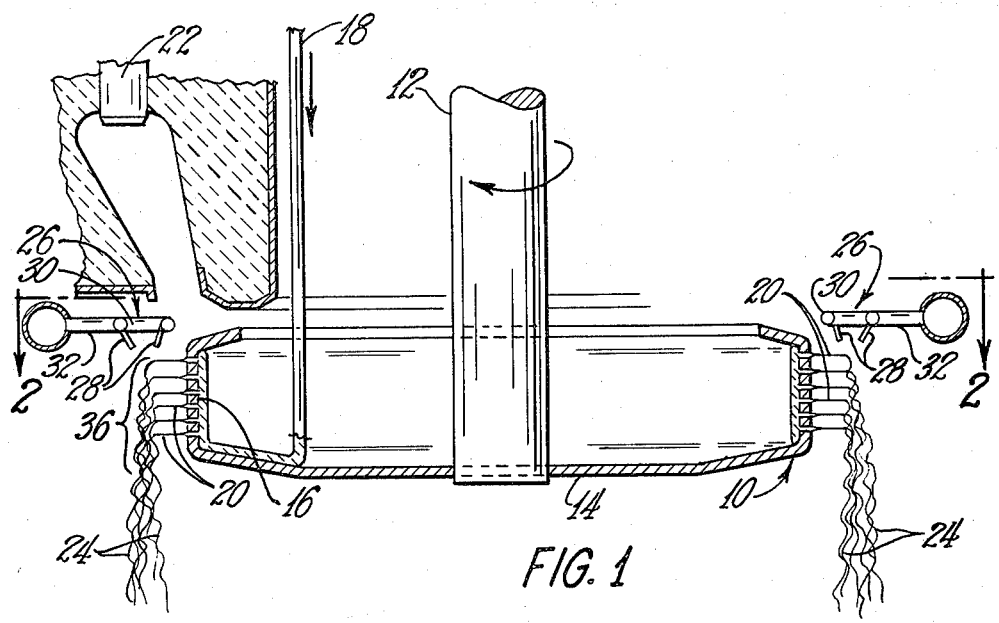
FIG. 1 is a schematic cross-sectional elevation view of apparatus for forming mineral fibers according to the principles of this invention.

As shown in FIG. 1, spinner 10 is mounted for rotation on quill 12, and can be comprised of spinner bottom wall 14 and orificed peripheral wall 16. Molten glass stream 18 drops into the bottom of the spinner and flows outwardly and upwardly to the spinner peripheral wall through which it passes to form primary fibers 20. The primary fibers can have a diameter within the range of from about 15 to about 25 microns, although the principles of the invention will apply for primary fibers having greater or lesser diameters. The primary fibers are maintained in a plastic, attenuable condition by the heat supplied from annular burner 22.

Figure 2:
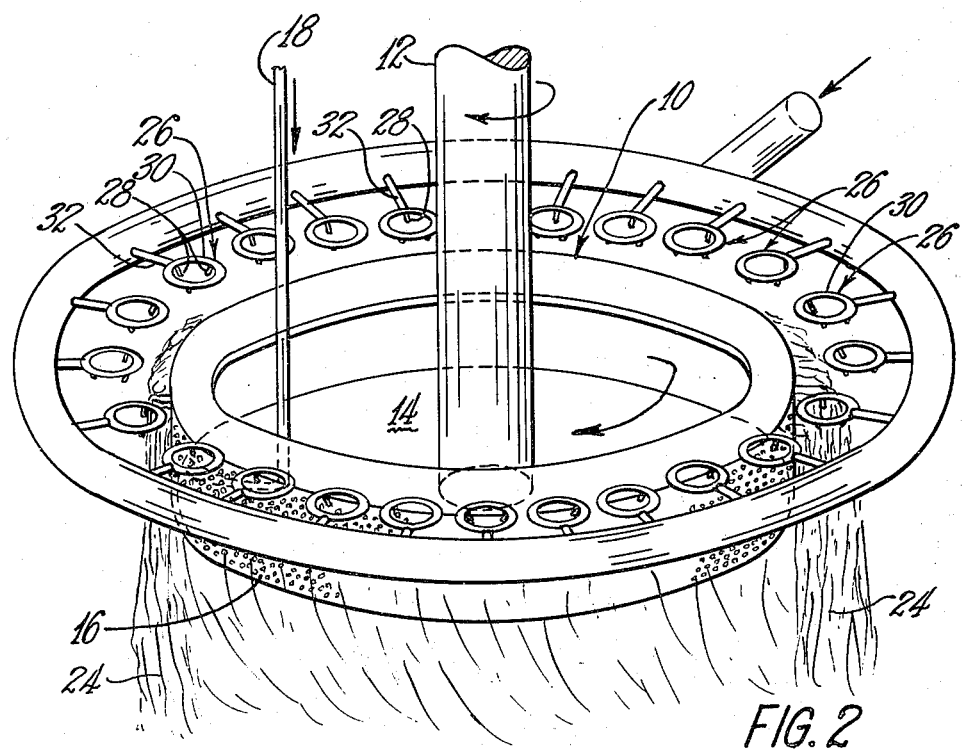
FIG. 2 is a schematic plan view taken along line 2—2 of FIG. 1.
Figure 3:
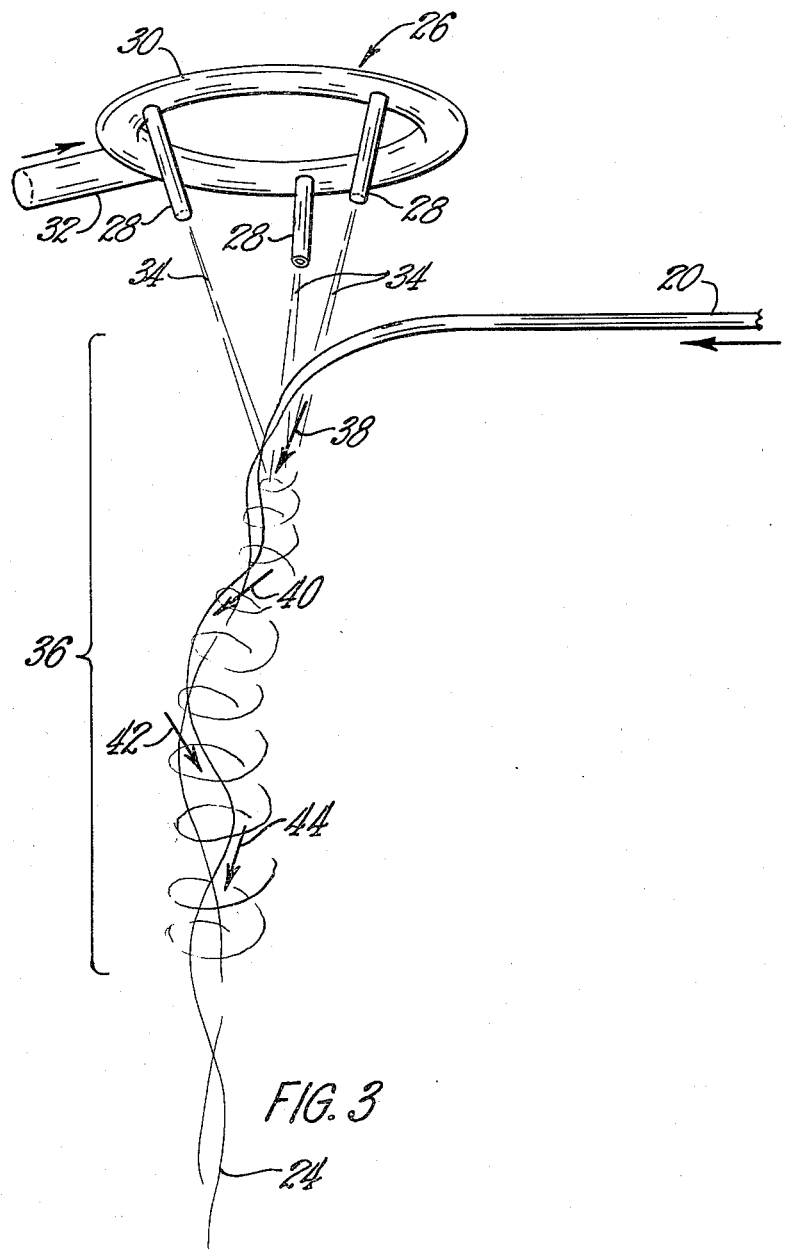
FIG. 3 is a schematic view illustrating one embodiment of a turbulent flow generator of the invention.

The primary fibers are further attenuated into secondary fibers 24 by the action of a turbulent flow of gases discharged from the turbulent flow generators 26. As shown in the embodiments of FIGS. 1, 2 and 3, the turbulent flow generators can be comprised of gas discharge conduits 28, which can be connected by manifolds 30 and supplied by supply conduits 32 from a source not shown. The gas discharge conduits emit gas streams which interact to form zone 36 of turbulent gaseous flow. The zone of turbulent gaseous flow can be a vortex as shown in FIGS. 1, 2 and 3.

As shown in FIG. 2, there are a plurality of turbulent flow generators circumferentially spaced about the spinner. In the preferred embodiment, the spinner will have a diameter of approximately 30 centimeters, and the number of turbulent flow generators will be within the range of from about 10 to about 100, thereby giving a spacing of approximately one to ten centimeters. Adjacent vortices created by adjacent turbulent flow generators can be counter-rotating, i.e., rotating in different directions.

As shown in FIG. 3, the primary fiber is introduced into the zone of turbulent gaseous flow generated by the turbulent flow generator. As the primary fiber is drawn through the zone of turbulent gases, it is pulled and tugged in different directions at different locations or loci, thereby providing improved attenuation of the fiber. The primary fiber can experience, for example, a downward attenuating force at locus 38, a lateral attenuating force at locus 40, a reverse lateral attenuation force at locus 42, and a further reversal of the attenuating force at locus 44. It can be seen that the fiber is whip-sawed or flung within the zone of turbulent gaseous flow. Under conditions in which the fiber is of a plastic attenuable state, the different forces at the different loci within the zone act to create attenuation forces at a multiplicity of loci within the zone. This provides for greatly increased attenuation efficiency over rotary fiber-forming systems of the past, for which secondary attenuation of the fibers occurs only at one locus.

Figure 4:
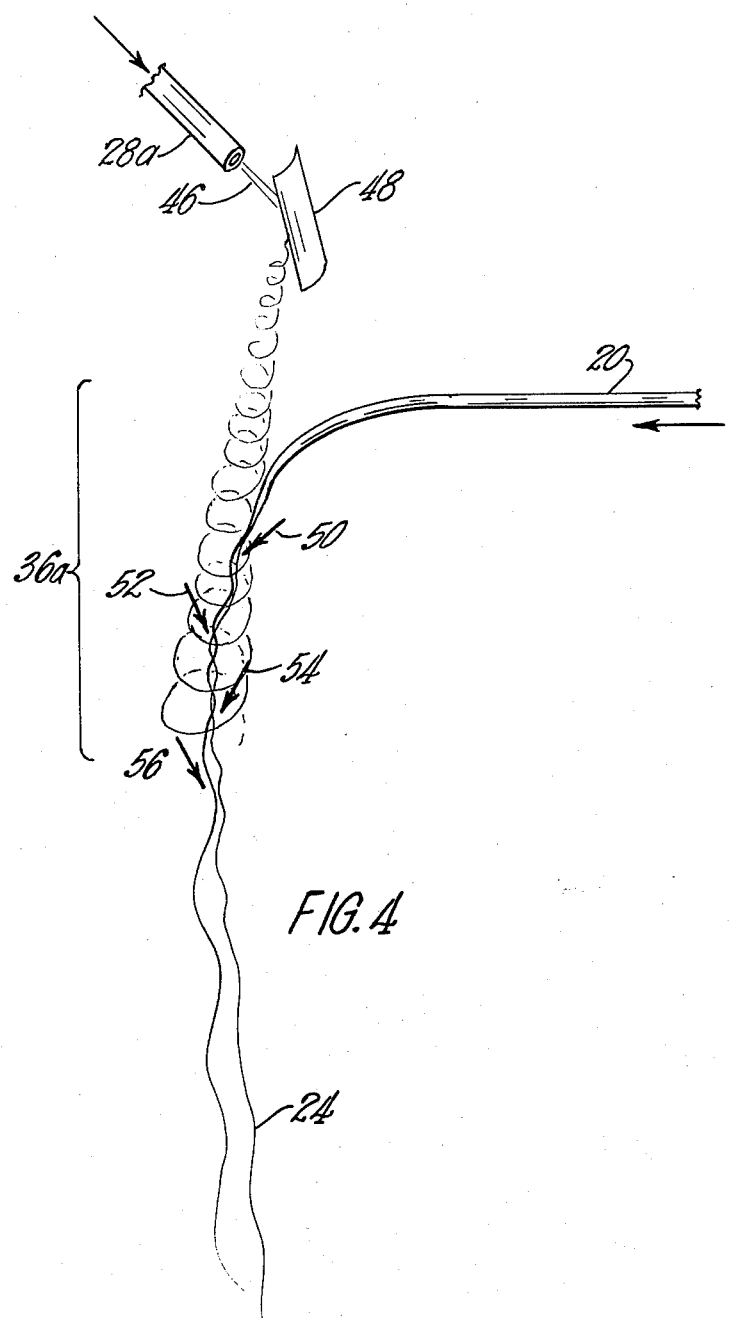
FIG. 4 is a schematic illustration of another embodiment of a turbulent flow generator of the invention.

Referring now to FIG. 4, there is shown another embodiment of the invention in which the turbulent flow generator comprises discharge conduit 28a discharging gas stream 46, which impinges on baffle 48 to create zone 36a of turbulent gaseous flow. It can be seen that the primary fiber experiences attenuating forces in different directions at different loci 50, 52, 54 and 56. Thus, the attenuation of the primary fiber into the secondary fiber occurs not just at one locus, but at a multiplicity of loci. The deflection of the gas stream from baffle 48 causes turbulence sufficient to create gaseous flows exerting attenuation forces in different directions along the path of the primary fiber within zone 36a of turbulent gases.

EXPLOITATION IN INDUSTRY

This invention will be found to be useful in the formation of fibers from molten glass for such uses as glass fiber thermal insulation products and glass fiber acoustical insulation products.

I claim:

1. Apparatus for attenuating molten mineral material into mineral fibers of the type in which an orificed spinner (10) is adapted to receive the molten mineral material and to centrifuge it into primary mineral fibers (20), and means positioned circumferentially of said spinner (10) is adapted to discharge a flow of gases to further attenuate said primary fibers (20) into secondary fibers (24), wherein the improvement comprises said means for discharging comprising a plurality of turbulent flow generators (26) for downwardly discharging rotating flows of gas to further attenuate said primary fibers (20) into secondary fibers (24).

2. The apparatus of claim 1 in which said turbulent flow generators (26) are vortex generators.

3. The apparatus of claim 2 in which each of said vortex generators comprises two or more gas discharge conduits (28) adapted to discharge gaseous flows (34) which interact to form a vortex.

4. The apparatus of claim 3 in which adjacent vortex generators are adapted to generate counter-rotating vortices.

5. The apparatus of claim 1 in which each of said turbulent flow generators (26) comprises a gas discharge conduit (28a) adapted to discharge a gaseous flow (46), and a baffle (48) positioned in the path of said gaseous flow (46), said baffle (48) being adapted to increase the turbulence of said gaseous flow (46).

6. The apparatus of claim 5 in which said baffle (48) is adapted to deflect said gaseous flow (46).

7. Apparatus for attenuating molten mineral material into mineral fibers of the type in which an orificed spinner (10) is adapted to receive the molten mineral material and to centrifuge it into primary mineral fibers (20), and means positioned circumferentially of said spinner (10) is adapted to discharge a flow of gases to further attenuate said primary fibers (20) into secondary fibers (24), wherein the improvement comprises said means for discharging comprising a plurality of turbulent flow generators (26) for downwardly discharging rotating flows of gas to further attenuate said primary fibers (20) into secondary fibers (24), each of said turbulent flow generators (26) being adapted to generate gaseous flows (34) exerting attenuation forces in different directions along the path of the fiber being further attenuated.

8. The apparatus of claim 7 in which said attenuation forces occur at spaced-apart loci (38, 40, 42, 44) within the turbulent flow.

9. The method for attenuating molten mineral material into mineral fibers of the type in which an orificed spinner (10) receives molten mineral material and centrifuges it into primary mineral fibers (20), and a flow of gases is discharged circumferentially of said spinner (10) to further attenuate said primary fibers (20) into secondary fibers (24), wherein the improvement comprises downwardly discharging said flow of gases from a plurality of turbulent flow generators (26) positioned circumferentially of said spinner (10) and introducing said primary fibers (20) into zones (36) of turbulent gaseous flow created by said turbulent flow generators (26).

10. The method of forming fibers comprising centrifuging molten mineral material into primary fibers (20) with a rotating spinner (10), and further attenuating said primary fibers (20) into secondary fibers (24) by exerting attenuation forces in different directions at different loci (38, 40, 42, 44) within each of a plurality of zones (36) of turbulent gaseous flow, said zones (36) being positioned circumferentially of said spinner (10).

11. The method of claim 10 comprising generating vortices to produce said attenuation forces.

12. The method of claim 11 comprising discharging gas from two or more gas discharge conduits (28) to generate said vortices.

13. The method of claim 12 in which adjacent vortices are counter-rotating.

14. The method of claim 10 comprising discharging gas (46) from a gas discharge conduit (28a) and deflecting said gas (46) with a baffle (48) to generate said turbulent gaseous flow.

15. The method of forming fibers comprising centrifuging molten mineral material into primary fibers (20) with a spinner (10), generating a plurality of zones (36) of turbulent gaseous flows positioned circumferentially of said spinner (10), each of said zones (36) having gas flow in different directions at different loci (38, 40, 42, 44) within the zone (36), and further attenuating said primary fibers (20) into secondary fibers (24) by introducing said primary fibers (20) into said zones (36).

* * * * *